UNITED STATES PATENT OFFICE.

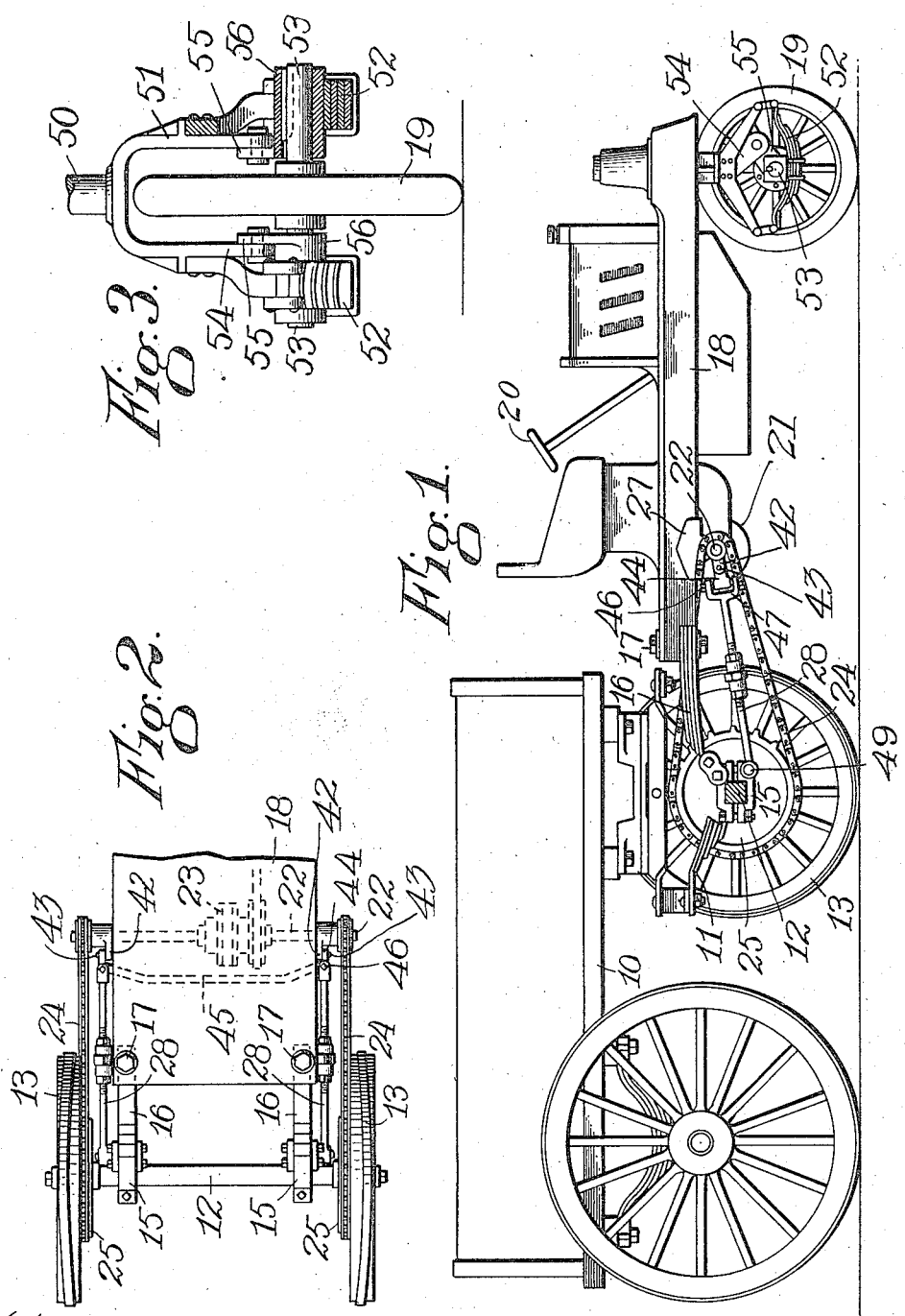

CHARLES H. MARTIN, OF WORCESTER, MASSACHUSETTS.

EQUALIZING DEVICE FOR VEHICLES.

1,144,943.      Specification of Letters Patent.    Patented June 29, 1915.

Application filed January 18, 1912. Serial No. 671,798.

*To all whom it may concern:*

Be it known that I, CHARLES H. MARTIN, a citizen of the United States, residing at Worcester, in the county of Worcester and State of Massachusetts, have invented a new and useful Equalizing Device for Vehicles, of which the following is a specification.

This invention relates to vehicles, and the principal object thereof is to provide an efficient equalizing device for preventing one side of the vehicle from being depressed more than the other.

The invention also relates to details thereof and to a principle of construction applicable alike to the rear and front wheels, and to the ordinary two wheeled axle and to a single front wheel.

Reference is to be had to the accompanying drawings in which—

Figure 1 is a side view of a vehicle constructed in accordance with this invention; Fig. 2 is a partial plan thereof; and Fig. 3 is a front elevation partly in section through the front axle.

This invention is illustrated herein as applied to a vehicle of the type shown in my patent granted on the 20th day of February, 1912, No. 1,018,248, but it is to be understood that it is capable of general application. Following my above mentioned patent, the drawings show the invention as applied to a vehicle or truck having a body 10, springs 11, front axle 12, and front wheels 13. The front axle 12 also constitutes the rear axle of the front propelling vehicle. The clamps 15, springs 16 and bolts 17 of my prior patent are shown in connection with the body or frame 18 of the propelling vehicle. The latter is shown as provided with a steering wheel 19 and handle 20 and with a motor 21 having a driving shaft 22 and differential 23 for driving the chain 24 and sprocket wheel 25, all as shown in my above mentioned patent.

The hangers 27 on which the shaft 22 is located are shown as indirectly connected with adjustable strut rods 28 corresponding with similar strut rods shown in said patent. In this case, however, the equalizing arrangement is shown as connected with these parts. On the hangers 27 are located rigid slightly inclined arms 42 on opposite sides of the body or frame of the vehicle. Pivotally connected to these arms by horizontal pins 43 are a pair of arms 44 projecting forwardly from a rigid equalizing or torsion bar 45. This equalizing bar extends across under the body of the vehicle and is pivoted on substantially upright pivots 46 carried by forks 47 on the upper ends of the two strut rods 28. These strut rods as is the case in my prior patent are pivoted on horizontal axes 49 on the axle 12. The equalizing bar 45 with its forward projections 44 consists of a single rigid piece which is large enough to prevent torsion when the weight is applied to one end.

The same principles are carried out on the front wheel. In this case the frame is shown as provided with a vertical shaft 50 having opposite hangers 51 extending down therefrom. These are connected by springs 52 with a horizontal front axle 53. On each hanger is an arm 54 corresponding in function with the arms 42. These arms are pivotally connected with a pair of arms 55 each rigid with respect to a member 56 which in turn is keyed to the axle 53 which in this instance itself constitutes the equalizer bar.

In both cases when more weight is thrown on one side than the other the tendency to depress the spring on that side more than the opposite spring is resisted by the equalizing device. Consequently if from any cause the center of gravity is thrown from one side to the other of the vehicle the springs on that side would normally get more load than the opposite springs, and the car would tend to take a position at an angle to the horizontal. This tendency forces down the arm 54 or 42 on that side, and consequently turns the arm 55 or 44. This turning motion is transmitted directly to the other side of the device through the shaft 53 in one case and the bar 45 in the other. This turns the corresponding arm 55 or 42 to which it is connected and brings down the other side of the vehicle to an equal degree. In the case of the form shown on the front wheel the arm 55 turns about the center of the axle as a center, but in the other case the arms 44 turn about the axis 49, the result however, being the same in both cases. It has been found in practice that in both of these devices the machine is kept on a horizontal plane even under the most severe usage, and that this principle is an important factor in the three wheeled vehicle 18, rendering it still more practical and efficient.

The simplicity of both forms of the invention and the general application of the same will be obvious.

Although I have illustrated and described two preferred embodiments of the invention, I am aware that many modifications can be made therein by any person skilled in the art without departing from the scope of the invention as expressed in the claims. Therefore I do not wish to be limited to these particular forms or to the particular application thereof shown, but What I do claim is:—

1. In a vehicle, the combination with a body yieldingly supported, of means whereby when one side of the body tends to be depressed the downward motion will be transmitted equally to the other side, comprising a movably mounted rigid member extending across the vehicle under the body and adapted to turn about an axis to transmit the motion and having rigid parallel arms at its ends, a pair of rigid parallel arms on the body pivoted to the first named arms by horizontal pivots, and means for connecting the ends of said rigid member with the rear axle of the vehicle.

2. In a vehicle, the combination with a body having a rear axle, said body being yieldingly supported from the rear axle, of a driving shaft extending across the body, two arms extending out adjacent to the driving shaft on opposite sides of the body, an equalizing bar extending across the body and having two rigid arms, each horizontally pivoted to one of the first named arms, and a pair of strut rods pivoted to the axle horizontally and pivoted to the opposite ends of said equalizer bar on vertical axes.

3. In a vehicle, the combination with an axle and a body yieldingly connected therewith, of a rigid arm on each side of the body, an equalizing bar extending from one side of the body to the other, a rigid arm on each end of the bar, each pivoted horizontally to one of the arms on the body, and a pair of strut rods for connecting the body with the axle, each strut rod having a fork provided with a substantially upright pivot, said equalizing bar being mounted at its ends on said pivots.

4. In a vehicle, the combination with an axle and a body yieldingly supported therefrom, of strut rods extending from the axle upwardly toward the body, a transverse member carried by said strut rods and pivoted thereto at its ends on upright axes, and means whereby the descent of one side of the body will turn said transverse member and depress the other side of the body equally.

5. The combination with a vehicle, of a frame provided with a front steering support and a rear axle and yieldingly connected at the rear with said axle, wheels on said axle, a power shaft on said frame, adjustable strut rods removably connecting said shaft with said axle, said shaft being rotatable independently of said strut rods, a motor on said frame geared up to the wheels of the vehicle through said shaft, and means connected with said strut rods for depressing the high side of the frame when the frame tends to tilt.

6. In a vehicle, the combination with a yieldingly supported body, of an equalizing bar extending from one side of the body to the other under it, and a pair of strut rods extending upwardly toward the ends of the equalizing bar and each having a substantially upright pivot to which the ends of said equalizing bar are pivoted.

In testimony whereof I have hereunto set my hand, in the presence of two subscribing witnesses.

CHARLES H. MARTIN.

Witnesses:
 ALBERT E. FAY,
 C. FORREST WESSON.